UNITED STATES PATENT OFFICE.

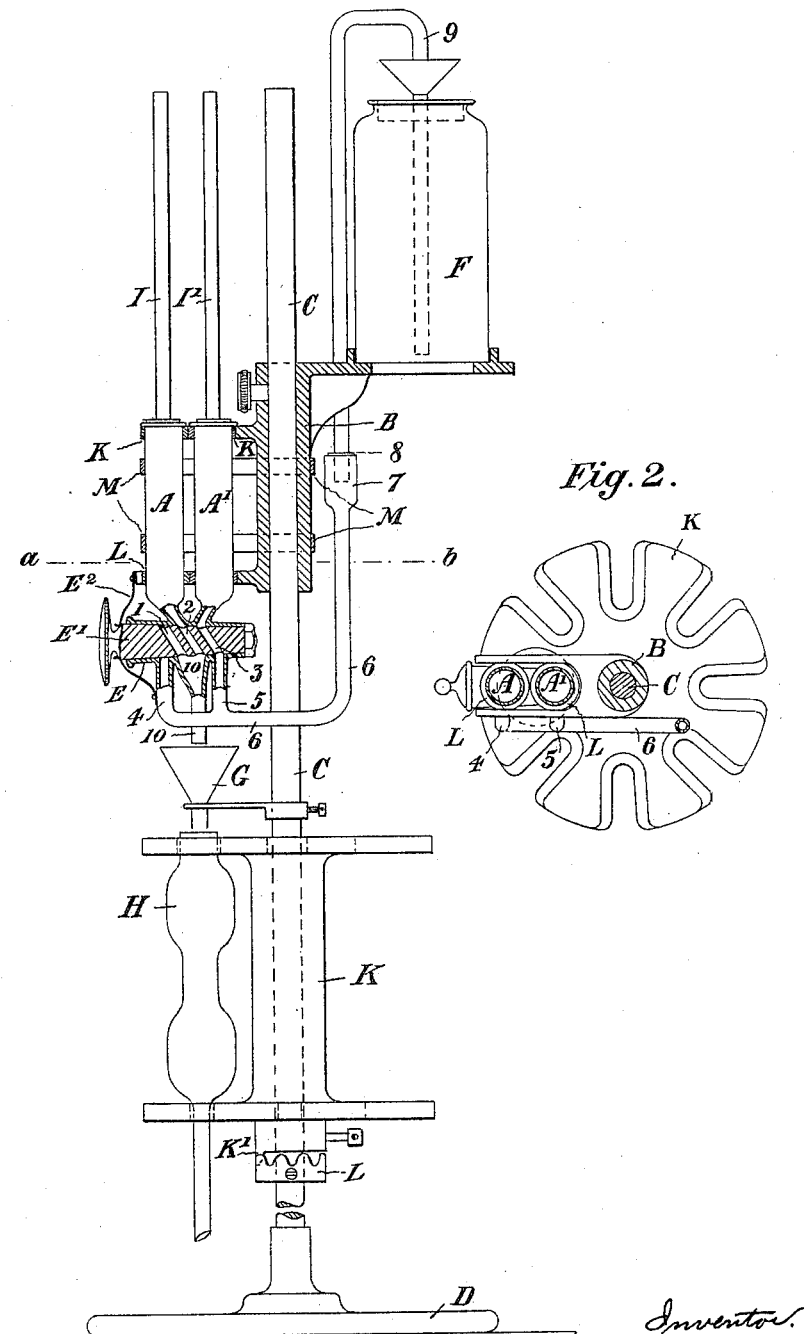
(No Model.)
A. W. STOKES.
APPARATUS FOR TESTING AMOUNT OF FAT IN MILK.
No. 599,369.                    Patented Feb. 22, 1898.

ALFRED WALTER STOKES, OF LONDON, ENGLAND, ASSIGNOR TO R. A. LISTER & CO., LIMITED, OF DURSLEY, ENGLAND.

APPARATUS FOR TESTING AMOUNT OF FAT IN MILK.

SPECIFICATION forming part of Letters Patent No. 599,369, dated February 22, 1898.

Application filed October 27, 1897. Serial No. 656,566. (No model.)

*To all whom it may concern:*

Be it known that I, ALFRED WALTER STOKES, F. C. S., F. I. C., a subject of the Queen of Great Britain, and a resident of 60 Parkhill Road, Haverstock Hill, London, England, have invented a certain new and useful Apparatus for Automatically Measuring Off Quantities of Liquid, Specially Applicable for Testing the Amount of Fat in Milk, of which the following is a specification.

The apparatus is intended for quickly, readily, and accurately measuring off quantities of liquid in an automatic manner.

It consists, essentially, of two measuring vessels, a cock with three passages, a liquid-supply reservoir, and suitable pipe connections from and to the vessels, the reservoir, and the cock, all so arranged that while one filled vessel is being drawn off the other is being filled, so that no time is lost. There are besides devices for adjusting the vessels to be filled only with the exact desired quantity, and devices may also be provided for readily and in succession filling a number of receptacles with liquid from the measuring vessels.

Figure 1 is a part-sectional elevation of the whole apparatus. Fig. 2 is a plan section on line *a b* of Fig. 1.

A and A' are two measuring vessels placed side by side in a frame B, which is fixed to a post C, that rests in a socket-plate D. The vessels A and A' are below connected by pipes to the barrel E of a tap, the plug E' of which has three passages 1, 2, and 3 through it, by preference slanting and parallel. The barrel E has also two branches 4 and 5, which terminate in a common pipe 6, that leads up toward the liquid-supply reservoir F. There is a junction in this pipe having an enlargement 7, with a cork 8 inserted for the upper part to enter, and thus preserve these glass pipes from breaking, this upper part by a siphon-bend 9 through a stopper in the known manner into the reservoir F passing down to the bottom thereof. The cock-barrel E has a lower outlet-pipe 10 to the funnel G for passing the measure of liquid into the glass receptacle H. The spring $E^2$ serves to keep the plug E' in its seat. Through a top stopper, by preference of india-rubber, of each measuring vessel A and A' is passed a small capillary stand-pipe I and I'. These pipes are long enough to reach above the top of the liquid-reservoir F. The extent to which these pipes are inserted down into the vessels A and A' determines the extent or height to which these vessels are to be filled, for beyond a minute quantity that runs up a short distance into these pipes the flow of liquid into them will cease the moment the level indicated by the bottom of the pipes is reached. The vessels A A', being of glass, should be held elastically in the frame B—for instance, by rubber seating or rings K and L and rubber bands M.

The action of the apparatus is as follows: The plug E' of the cock is first turned so as to put one of the vessels—say A'—in communication with the reservoir F, so as to fill it up to the bottom of the pipe I', for the flow ceases when the liquid reaches that level, and no liquid is spilled or wasted even if the apparatus is left standing in that condition. The plug is then turned so that the vessel A communicates with the receptacle H by the pipe 10 and funnel G, and the vessel A will empty itself therein, while simultaneously the vessel A' is put in communication with the reservoir F and is filled therefrom. Thus no time is lost and the reservoir can never be emptied by carelessness whatever the position of the cock may be; but at most one measure of liquid might be lost by careless use.

For some purposes it is convenient to fit the apparatus with a frame—such, for instance, as K—which is rotatable round the post C and adapted to receive a number of receptacles H. In order to adapt it to receptacles of somewhat varying lengths, (for glass vessels are seldom made exactly alike in length,) a toothed ring-cam L is fixed on the post C below the rotatable frame K, and the latter is fitted with a small projection or tooth K', which enters one tooth-notch after the other in the ring-cam L as the frame is periodically turned, thus slightly and lowering the said frame and bringing each receptacle H in turn immediately under the outlet-pipe 10 from the cock.

In some cases the post or standard C may be adapted to receive more than one liquid-supply reservoir. Thus, for instance, for testing the amount of fat in milk the standard may be fitted with one reservoir for sulfuric acid to be measured off as described and another reservoir for fusel-oil to be run in without special measuring apparatus; but for some cases, where two or more valuable liquids have to be measured off, the apparatus is made with two or more sets of measuring appliances of the kind described.

Having now described my invention, what I claim as new, and desire to secure by Letters Patent, is—

1. A liquid measuring and drawing-off apparatus consisting mainly of two measuring vessels, capillary stand-pipes therein for adjusting the liquid-level in the said vessels according to the measure desired to be drawn off, an overhead liquid-supply reservoir a cock with through-passages for alternate communication between one or other of the said vessels (one of which is being filled while the other is emptied) the reservoir and an outlet to a liquid-receptacle, and a pipe communicating with the cock, its other end connected with the lower part of the supply-reservoir, substantially as and for the purpose set forth.

2. A liquid measuring and drawing-off apparatus consisting mainly of two measuring vessels, capillary liquid-level, adjusting stand-pipes therein, an overhead liquid-supply reservoir, a cock fitted to the bottom of the measuring vessels and provided with three through-passages for alternative communication between one or other of the said vessels (one of which is being filled while the other is emptied) the supply-reservoir and an outlet to a liquid-receptacle, a pipe communicating by two branches with the cock, its other end descending with a siphon-bend into the supply-reservoir, and a post or standard for receiving the parts named substantially as set forth.

3. In a liquid measuring and drawing-off apparatus the combination of a post or standard, two measuring vessels capillary stand-pipes therein, and overhead liquid-supply reservoir, a cock fitted to the bottom of the measuring vessels and fitted with through-passages for alternative communication between one or other of the said vessels, the reservoir and an outlet to a liquid-receptacle, suitable pipe connections between the cock, the reservoir and an outlet to a liquid-receptacle, a post or standard for receiving the parts named, a frame rotatable on the post adapted to receive a number of liquid-receptacles to be filled in succession and provided with a tooth, and a ring-cam fixed on the standard and provided with notches for the tooth on the rotatable frame to mesh with and corresponding with the number of receptacles, substantially as and for the purpose set forth.

ALFRED WALTER STOKES.

Witnesses:
V. JENSEN,
FRED C. HARRIS.